3,120,423
PROCESS FOR COLORING SYNTHETIC
POLYMERIC MATERIALS
Robert J. Herschler and Rainer G. Jaffe, Camas, Wash., assignors to Crown Zellerbach Corporation, San Francisco, Calif., a corporation of Nevada
No Drawing. Filed Nov. 7, 1960, Ser. No. 67,491
18 Claims. (Cl. 8—55)

This invention relates to a process for coloring synthetic polymeric materials, and in particular to an improved process for coloring synthetic organic polymeric materials, with a coloring composition containing a colorant in admixture with a dialkyl sulfoxide.

In the commercial procedures, synthetic polymeric materials are treated with solutions or dispersions of colorants at a temperature depending on the nature of the material and the coloring composition employed. The period of treatment of the polymeric material in the coloring bath may range up to several hours after which the material is rinsed and dried. A number of liquid vehicles for the colorants have been investigated. Among those, either proposed or employed, are water, ethyl alcohol, acetone, ethylene glycol, n-aliphatic substituted aliphatic acid amides, such as dimethyl formamide, hydroxylamine and its salts, and others. However, the results attained with the various liquid vehicles for colorants are not all together satisfactory. In some cases, the liquid vehicle may be used only in admixture with a limited number of colorants. The coloring process is often very slow and requires a large volume of the coloring bath. Many of the known solvents or vehicles for colorants are not compatible with the polymeric material to be colored. In some cases a colorant admixed with a liquid carrier does not impart to the polymeric material to be colored the desired fastness to light, resistance to rubbing and resistance to migration. Certain organic solvents which appeared to produce satisfactory results in combination with some colorants have not entered into commercial use because of their high cost.

It is the primary object of this invention to provide an improved process for coloring synthetic organic polymeric materials to any desired color intensity.

Another object of this invention is to provide an improved method for coloring synthetic organic materials such as polyesters, polyamides, polyolefins, acrylonitrile polymers and copolymers, vinyl polymers and copolymers, vinylidene polymers and copolymers, epoxies, polyurethanes, and cellulose derivatives either during their manufacture or after they have been produced in their final form.

A particular object of this invention is to provide an improved process for the manufacture of colored synthetic polymeric materials by applying thereto a solution or dispersion of a colorant in a dialkyl sulfoxide.

According to the present invention, generally stated, various synthetic polymeric materials in the form of latexes, pellets as well as finished materials, such as fibers, threads, fabrics, films, yarns, and the like are colored rapidly and effectively utilizing a soluble dyestuff or an insoluble pigment in admixture with a dialkyl sulfoxide as a vehicle therefor.

Illustrative of the various classes of synthetic polymeric materials which may be colored in accordance with the process of the present invention as hereinafter set forth in greater detail are materials resulting from polymerization or copolymerization of esters, amides, olefins, acrylonitriles, vinyl compounds, vinylidene compounds, epoxies, urethanes, and cellulose derivatives. In one embodiment of the present invention, such materials may be colored while in the form of liquid resins which are thereafter extruded, molded, cast, or cured to their final polymeric form in accordance with any of the conventional procedures. Other types of polymeric materials which may be colored in the course of their manufacture include polyoxymethylenes, polycarbonates, polysiloxanes, aminoplasts, phenol-aldehyde resins and others.

In another embodiment of this invention, manufactured polymeric materials in the form of fibers, films, yarns, fabrics, etc. are passed through a dye bath comprising a soluble dyestuff dissolved in a dialkyl sulfoxide for a short period of time during which the sulfoxide aids the dyestuff to penetrate the polymeric material to yield the desired intensity of color.

Among the specific polymeric materials considered capable of being colored in accordance with the present invention may be mentioned Dacron, nylon, polyethylene, polypropylene, polyacrylonitrile, butadiene-acrylonitrile, polyvinyl chloride and its copolymers, polyvinylacetate and its copolymers, polystyrene and its copolymers, vinylidene chloride and its copolymers, the reaction product of epichlorohydrin and bis-phenol A, the reaction product of a polyisocyanate and a polyester, cellulose acetate, viscose and others.

The number of colorants, either soluble or insoluble in dialkyl sulfoxide, which may be utilized in accordance with the present process is very large. By way of examples, there may be mentioned the acid dyes, the direct metallisable and non-metallisable dyes, mordant dyes, phthalocyanines and their derivatives, the lueco esters of vat dyes, inorganic pigments and many other colorants which are known and available on the market.

Although many dialkyl sulfoxides are suitable as vehicles or carriers for colorants in accordance with the process of this invention, it is preferred to use the alkyl-methyl sulfoxides or lower dialkyl sulfoxides containing up to 8 carbon atoms. A particularly suitable representative of these is dimethyl sulfoxide supplied by Crown Zellerbach Corporation of San Francisco, California.

As mentioned hereinabove, one of the features of the process of this invention resides in the fact that the polymeric materials may be colored in the course of their manufacture. In this procedure, the colorant may be employed in the form of either a solution or a finely divided dispersion in a dialkyl sulfoxide. It will be understood that the liquid coloring composition may also be in the form of a partial solution and a partial dispersion. The liquid coloring composition is added to the polymer mass in accordance with conventional procedures and mixed therewith until a substantially uniform distribution of the colorant is attained. The colored polymer mass is thereafter processed for its conversion into the desired final form or shape.

It is also within the scope of this invention to combine first the polymer mass and the sulfoxide, followed by addition of a colorant, as well as to combine first the polymer mass and the colorant and then incorporate the sulfoxide into the mass. In some cases, it may be desirable to apply heat and mechanical action to the mixture of the polymer mass and the coloring composition in order to insure that the colorant is well distributed throughout the mass.

In the operation of the improved coloring process of this invention with the use of finished polymeric materials such as fibers, films, yarns, etc., a soluble dyestuff is admixed with a sulfoxide, the mixture is heated, if necessary, to produce a coloring solution, the polymeric material is passed through the coloring solution using a very short immersion time, and finally the colored material is passed through the conventional washing and drying cycles.

When polymeric materials in the form of an emulsion or a dispersion in a polar liquid, such as water, are to be colored, a solution or a dispersion of a colorant in a dialkyl sulfoxide is incorporated thereto and distributed therein by any of the standard mechanical procedures.

Due to superior properties of dialkyl sulfoxides as a liquid vehicle for colorants, the process of this invention is characterized by a very short contact time of the colorant with the polymeric material. Usually, a period of up to 1 minute is sufficient to attain a desired depth of color. However, the immersion time is correlated with the concentration of the colorant in the sulfoxide as well as the type of the polymeric material employed and the desired depth of color shade to be attained.

The concentration of the colorant employed in admixture with the sulfoxide is also dependent primarily upon the shade or depth of color desired in the polymeric material and it varies widely with the various types of dyestuffs and pigments. As an illustration, as little as about 0.5% by weight of the colorant, based on the weight of the coloring composition, is sufficient to produce satisfactorily tints. On the other hand, from about 1% to 20% of the colorant by weight, or even more may be necessary where strong, vivid colors are required.

The coloring operation according to the present invention may be effectuated at a temperature ranging between about 20° C. and the boiling point of the sulfoxide employed and it will depend on the type of the coloring composition and the type of the polymeric material. In the preferred embodiment of this invention, the coloring procedure is carried out at a temperature between about 60° C. and 140° C. It will be understood by those skilled in the art that, in any event, the maximum temperature of the coloring composition during the coloring operation must be lower than the melting point of the polymeric material to be colored.

If desired, coloring solutions comprising, as essential constituents, a colorant and a dialkyl sulfoxide, may be supplemented by various conventional additives such as antioxidants, antistatic agents, ultraviolet light screening compounds, fillers, leveling agents, etc. which are known additives employed conventionally in the manufacture of polymeric materials.

The following examples will serve to illustrate the novel process of this invention. These examples are to be construed as merely illustrative and not as limiting the scope of the invention as described and claimed. Unless otherwise indicated, all parts in the examples are expressed by weight.

*Example 1*

One part of a phthalocyanine green colorant was dissolved in 100 parts of dimethyl sulfoxide with heating to 120° C. The resulting colorant solution was held at 120° C. and polypropylene fibers were passed through the bath at a rate to give a 1 minute immersion time in the dyebath. Thereafter the fibers were processed through a water rinse and soap-off. The fibers accepted an even green color.

*Example 2*

Following the procedure of Example 1, polyamide fibers, i.e. nylon 66, were colored. The treated fibers were found to be colored satisfactorily.

*Example 3*

The procedure of Example 1 was repeated using polyester fibers, i.e. Dacron. The resulting fibers were colored satisfactorily to an even shade.

*Example 4*

One part of a sulfur blue dye Color Index No. 53,450 was dissolved in 100 parts dimethyl sulfoxide by heating to 110° C., 0.05 part $FeCl_3$ was added to the resulting dyebath. The dyebath was held at 110° C. and polypropylene fiber was immersed therein for periods of 1, 15, 30 and 60 minutes, followed by a water rinse and soap-off. A strong blue tint was imparted to the fiber by the 1 minute treatment. The color strength increased with increased immersion time. Dacron and nylon fibers subsequently were passed through this same bath under identical conditions and similar results were obtained.

*Example 5*

One part of Hansa yellow colorant was dissolved in 100 parts dimethyl sulfoxide while heating to 100° C. The resulting dyebath was held at 100° C. and a polyester film, i.e. Mylar, was passed through the bath allowing a contact time of 1 minute. The film was then passed through a water rinse cycle and dried. A strong yellow color was imparted to the film.

*Example 6*

One part of a yellow disperse dye for polyester fibers was dissolved in 100 parts of methyl-butyl sulfoxide heated to 95° C. The dye solution was maintained at 95° C. and used to impregnate a piece of nylon 66 cloth. The impregnated cloth, held under tension, was placed in a circulating air-oven set at 95° C. and held there for 30 seconds. The cloth was rinsed in water, soaped off, and noted to have absorbed a strong yellow color evenly throughout its body.

*Example 7*

Two parts of pigment red 2–B were added to 10 parts of methyl-decyl sulfoxide maintained at 100° C. On cooling to 60° C. with stirring it was observed that the composition appeared to be part solution and part dispersion. 0.5 part of the composition was added to 100 parts of a commercial liquid polyester resin, i.e. Polylite 8100. The addition was made stepwise by first blending the composition with 5 parts of the resin, then adding the color concentrate into the remaining 95 parts of the resin with vigorous stirring. Methyl ethyl ketone peroxide was then added to the mixture as a curing catalyst. Castings and glass cloth impregnants were prepared therefrom. The cured products were observed under a 150-power magnification and noted to have excellent color distribution.

*Example 8*

A medium melt index polyethylene of a commercial grade was colored using a composition containing cadmium selenide red in admixture with dimethyl sulfoxide. Three alternative coloring procedures were applied.

In the first, 450 parts of polyethylene pellets were wet with 0.5 part of dimethyl sulfoxide, extruded as a ribbon, then chopped. One part of dry cadmium selenide red pigment was added to the chopped ribbon as a surface coat and the dry-colored polymer was injection-molded as a multi-thickness chip. Color dispersion was rated good.

In the second method, 450 parts of the same polymer was wet with 0.5 part of dimethyl sulfoxide, then 1 part of the same colorant was added thereto with good mixing. These surface-colored polyethylene pellets were extruded as ribbons, chopped, and then injection-molded as a multi-thickness chip. Color dispersion was rated excellent.

In the third method, 450 parts of the same polymer was wet with a paste consisting of a mixture of 1 part of dimethyl sulfoxide heated to 85° C. with 1 part of the cadmium selenide red pigment. The surface-colored pellets were extruded as ribbons, chopped, then injection-molded as a multi-thickness chip. Color dispersion was rated excellent.

In order to compare the three foregoing methods with the conventional coloring procedure, the same polyethylene pellets were processed with the same pigment without the sulfoxide. The resulting product was found to be of inferior quality, as regards the dispersion of the colorant and the tint strength.

*Example 9*

450 parts of a commercial clear medium impact polystyrene in the form of crushed granules were first wet with 1 part of dimethyl sulfoxide. Thereafter 0.25 part of a commercial phthalocyanine blue pigment was added with tumble mixing. Portions of the resulting mixture were injection-molded as multi-thickness chips and compared with chips prepared in the same manner but without using the sulfoxide. It was easily observed that significantly better dispersion of color and higher tint strength were achieved in the colored materials prepared in the presence of the sulfoxide.

*Example 10*

50 parts of chrome yellow pigment were dispersed in 50 parts of dimethyl sulfoxide at 95° C. using standard sand-grinding equipment. This dispersion was diluted with equal parts of water containing 0.5% by weight of a non-ionic surfactant, i.e. alkyl aryl polyether alcohol. This diluted composition was added to various rubber latex dispersions as indicated below at a level of 1 part of pigment solids per 100 parts of latex solids. The polymeric latex dispersions employed were: acrylic, butadiene-styrene, butadiene-acrylonitrile and polyvinyl chloride copolymer. The resulting colored dispersions were suitable for incorporation into aqueous cellulosic fiber slurries. The tint strength was compared to that of the same latex dispersions colored in the same manner but without using the sulfoxide. It was observed that the latex dispersions colored in the presence of the sulfoxide were of markedly stronger tints and that the pigment cut more rapidly into the latex.

*Example 11*

A composition containing 5 parts of phthalocyanine green dispersed in 100 parts of dimethyl sulfoxide was prepared. 10 parts of this composition were added to 100 parts of a liquid epoxy resin, i.e. a condensation product of epichlorohydrin and bis-phenol A. Thereafter, an amine-curing catalyst was added and the mixture poured as a thin film on a polyethylene film. After curing, thin sections were found to be evenly colored. The color was rated excellent.

*Example 12*

The same composition as used in Example 11 was added to an acetone dope prepared with cellulose acetate resin. 1 part of dry pigment per 100 parts of resin solids were mixed together and thin castings on glass plates were made. The color dispersion in the dried films was rated excellent.

*Example 13*

10 parts of cadmium selenide red colorant were admixed with 100 parts of methyl decyl sulfoxide heated to 90° C. The resulting liquid coloring composition was added to a polyacrylonitrile spinning dope prepared with dimethyl formamide in an amount corresponding to 0.25% of the colorant based on the dry resin weight. The coloring composition was distributed uniformly and rapidly in the dope. A film cast from the dope had an excellent color.

*Example 14*

A polyvinyl chloride resin dry formulation for garden hose stock was worked on a heated two-roll mill. A dry inorganic molybdate orange colorant was added thereto in an amount of 1% based on the resin, followed by addition of 0.5% of dibutyl sulfoxide based on the weight of the resin. The mixture was worked on the mill for 15 minutes and taken off in form of a sheet. The same formulation treated under the same conditions but without the sulfoxide produced a sheet of lower color strength than that produced in the presence of the sulfoxide.

As is apparent, the present invention provides an improved and highly advantageous method for the manufacture of various colored synthetic polymeric materials due to the use of a dialkyl sulfoxide as a carrier or a vehicle for the dyestuff or pigment employed. It is to be understood that the present invention is not to be considered as being restricted to the polymeric materials and the sulfoxides disclosed in the foregoing description. Certain changes and modifications in the practice of this invention can be readily entered into without departing from its intended spirit and scope, as defined in the appended claims.

We claim:

1. A process for coloring a synthetic polymeric material which comprises treating said material with a composition comprising a colorant in admixture with a dialkyl sulfoxide, said sulfoxide being present as a vehicle for said colorant in an amount insufficient to dissolve said polymeric material.

2. A process of claim 1 wherein said composition is a dispersion of a colorant insoluble in said dialkyl sulfoxide.

3. A process of claim 1 wherein said composition is a solution of a colorant in said dialkyl sulfoxide.

4. A process of claim 1 wherein the dialkyl sulfoxide comprises an alkyl-methyl sulfoxide.

5. A process of claim 1 wherein the dialkyl sulfoxide contains up to 8 carbon atoms.

6. A process of claim 1 wherein the dialkyl sulfoxide comprises dimethyl sulfoxide.

7. A process of claim 1 wherein the synthetic polymeric material is a polyester.

8. A process of claim 1 wherein the synthetic polymeric material is a polyamide.

9. A process of claim 1 wherein the synthetic polymeric material is a polyolefin.

10. A process of claim 1 wherein the synthetic polymeric material is polyethylene.

11. A process of claim 1 wherein the synthetic polymeric material is polypropylene.

12. A process of claim 1 wherein the synthetic polymeric material comprises polyacrylonitrile.

13. A process of claim 1 wherein the synthetic polymeric material is a cellulose derivative.

14. A process for coloring a synthetic polymeric material in the form of fibers, threads, fabrics, films and the like which comprises treating such polymeric material with a solution of a colorant in dimethyl sulfoxide, the amount of said sulfoxide being insufficient to dissolve said polymeric material.

15. A process of claim 14 wherein said polymeric material is treated with the said solution at a temperature between about 60° C. and about 140° C. but below the melting point of said polymeric material.

16. A process for the manufacture of colored synthetic fibers, threads, films and the like polymeric materials which comprises treating a polymeric material, prior to its conversion in the final form, with a composition comprising a colorant in admixture with a dialkyl sulfoxide.

17. A process of claim 16 wherein said dialkyl sulfoxide comprises dimethyl sulfoxide.

18. In the process of coloring a synthetic polymeric material, the improved step which comprises applying to such material a solution or a dispersion of a colorant in a dialkyl sulfoxide, the amount of the sulfoxide being sufficient to attain a substantially uniform distribution of the colorant but insufficient to dissolve the polymeric material.

References Cited in the file of this patent

UNITED STATES PATENTS

| | | |
|---|---|---|
| 2,069,774 | Reid | Feb. 9, 1937 |
| 2,127,400 | Gibbs | Aug. 16, 1938 |
| 2,654,667 | Goodhue et al. | Oct. 6, 1953 |
| 2,806,829 | Capps | Sept. 17, 1957 |